United States Patent
Donley et al.

(10) Patent No.: US 11,223,575 B2
(45) Date of Patent: Jan. 11, 2022

(54) RE-PURPOSING BYTE ENABLES AS CLOCK ENABLES FOR POWER SAVINGS

(71) Applicant: Advanced Micro Devices, Inc., Santa Clara, CA (US)

(72) Inventors: Greggory D. Donley, San Jose, CA (US); Vydhyanathan Kalyanasundharam, Sunnyvale, CA (US); Mark A. Silla, Austin, TX (US); Ashwin Chincholi, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 33 days.

(21) Appl. No.: 16/725,901

(22) Filed: Dec. 23, 2019

(65) Prior Publication Data

US 2021/0194827 A1  Jun. 24, 2021

(51) Int. Cl.
| | | |
|---|---|---|
| *H04L 12/947* | (2013.01) | |
| *H04L 12/717* | (2013.01) | |
| *H04L 12/931* | (2013.01) | |
| *H04L 29/08* | (2006.01) | |
| *H04L 29/06* | (2006.01) | |

(52) U.S. Cl.
CPC ............ *H04L 49/25* (2013.01); *H04L 45/42* (2013.01); *H04L 49/356* (2013.01); *H04L 67/1097* (2013.01); *H04L 69/22* (2013.01)

(58) Field of Classification Search
CPC combination set(s) only.
See application file for complete search history.

(56) References Cited

U.S. PATENT DOCUMENTS

| | | | |
|---|---|---|---|
| 4,760,515 A | | 7/1988 | Malmquist et al. |
| 5,553,223 A | | 9/1996 | Greenlee et al. |
| 5,706,502 A | | 1/1998 | Foley et al. |
| 5,737,563 A | * | 4/1998 | Shigeeda ............ G06F 1/1616 |
| | | | 711/5 |

(Continued)

FOREIGN PATENT DOCUMENTS

| | | |
|---|---|---|
| WO | 96/38791 A1 | 12/1996 |
| WO | 00/31925 A1 | 6/2000 |
| WO | 2013077845 A1 | 5/2013 |

OTHER PUBLICATIONS

International Search Report and Written Opinion in International Application No. PCT/US2020/065567, dated Mar. 23, 2021, 15 pages.

*Primary Examiner* — Yee F Lam

(74) *Attorney, Agent, or Firm* — Rory D. Rankin; Kowert, Hood, Munyon, Rankin & Goetzel, P.C

(57) ABSTRACT

Systems, apparatuses, and methods for efficient data transfer in a computing system are disclosed. A source generates packets to send across a communication fabric (or fabric) to a destination. The source generates partition enable signals for the partitions of payload data. The source negates an enable signal for a particular partition when the source determines the packet type indicates the particular partition should have an associated asserted enable signal in the packet, but the source also determines the particular partition includes a particular data pattern. Routing components of the fabric disable clock signals to storage elements assigned to store the particular partition. The destination inserts the particular data pattern for the particular partition in the payload data.

20 Claims, 7 Drawing Sheets

(56) References Cited

U.S. PATENT DOCUMENTS

| | | |
|---|---|---|
| 5,761,513 A | 6/1998 | Yellin et al. |
| 5,815,653 A | 9/1998 | You et al. |
| 5,903,324 A * | 5/1999 | Lyons ................. H04N 19/152 375/240.26 |
| 5,909,701 A * | 6/1999 | Jeddeloh ............. G06F 13/1689 711/167 |
| 5,923,885 A | 7/1999 | Johnson et al. |
| 6,058,393 A | 5/2000 | Meier et al. |
| 6,119,247 A | 9/2000 | House et al. |
| 6,138,140 A | 10/2000 | Yokote |
| 6,163,263 A * | 12/2000 | Tice .......................... G06F 1/28 340/508 |
| 6,618,854 B1 | 9/2003 | Mann |
| 7,394,290 B2 | 7/2008 | Seo et al. |
| 7,596,647 B1 | 9/2009 | Van Dyke et al. |
| 8,095,816 B1 | 1/2012 | Chan et al. |
| 8,448,001 B1 | 5/2013 | Zhu et al. |
| 9,529,400 B1 | 12/2016 | Kumar et al. |
| 9,594,621 B1 | 3/2017 | Navilappa |
| 9,886,414 B2 | 2/2018 | Yun et al. |
| 9,971,700 B2 | 5/2018 | Loh |
| 9,983,652 B2 | 5/2018 | Piga et al. |
| 10,067,796 B1 | 9/2018 | Metcalf |
| 10,861,504 B2 | 12/2020 | Tsien et al. |
| 2002/0176306 A1 | 11/2002 | Abe et al. |
| 2003/0035371 A1 | 2/2003 | Reed et al. |
| 2003/0172149 A1 | 9/2003 | Edsall et al. |
| 2003/0191857 A1 | 10/2003 | Terrell et al. |
| 2004/0093404 A1 | 5/2004 | Snyder et al. |
| 2005/0198459 A1 | 9/2005 | Bogin et al. |
| 2005/0228531 A1 | 10/2005 | Genovker et al. |
| 2006/0109829 A1 | 5/2006 | O'Neill |
| 2006/0155964 A1 | 7/2006 | Totsuka |
| 2006/0165115 A1 | 7/2006 | Warren et al. |
| 2006/0171329 A1 | 8/2006 | Ying |
| 2008/0120441 A1 | 5/2008 | Loewenstein |
| 2008/0126750 A1 | 5/2008 | Sistla |
| 2009/0016355 A1 | 1/2009 | Moyes |
| 2009/0079843 A1* | 3/2009 | Kim ....................... H04N 19/42 348/222.1 |
| 2009/0168782 A1 | 7/2009 | Beshai |
| 2010/0211720 A1 | 8/2010 | Satpathy et al. |
| 2010/0309319 A1* | 12/2010 | Yanada ................ H04N 5/3765 348/207.1 |
| 2011/0035529 A1 | 2/2011 | Wang et al. |
| 2011/0119526 A1 | 5/2011 | Blumrich et al. |
| 2011/0138098 A1 | 6/2011 | Satpathy et al. |
| 2011/0219208 A1 | 9/2011 | Asaad et al. |
| 2011/0302339 A1* | 12/2011 | Umezawa ............... H04L 47/12 710/52 |
| 2012/0059962 A1 | 3/2012 | Lai |
| 2012/0072563 A1 | 3/2012 | Johnsen et al. |
| 2012/0221767 A1 | 8/2012 | Post et al. |
| 2013/0262767 A1* | 10/2013 | Lih ..................... G06F 12/0897 711/120 |
| 2014/0192583 A1 | 7/2014 | Rajan et al. |
| 2014/0201471 A1 | 7/2014 | Cutter et al. |
| 2014/0281083 A1 | 9/2014 | Canepa et al. |
| 2014/0354066 A1* | 12/2014 | Watanabe ............ H04B 5/0031 307/104 |
| 2015/0120978 A1 | 4/2015 | Kalyanasundharam et al. |
| 2015/0220460 A1 | 8/2015 | Litch et al. |
| 2015/0269396 A1 | 9/2015 | Grafton |
| 2016/0094435 A1 | 3/2016 | Goss et al. |
| 2016/0127191 A1 | 5/2016 | Nair |
| 2016/0188473 A1 | 6/2016 | Kruckemyer et al. |
| 2016/0191420 A1 | 6/2016 | Nagarajan et al. |
| 2016/0210381 A1 | 7/2016 | Singleton et al. |
| 2016/0293096 A1* | 10/2016 | Nose ..................... G09G 3/2092 |
| 2016/0323161 A1 | 11/2016 | Cuervo Laffaye et al. |
| 2016/0378168 A1 | 12/2016 | Branover et al. |
| 2017/0230733 A1 | 8/2017 | Rana et al. |
| 2017/0300427 A1* | 10/2017 | Lin ....................... G06F 12/128 |
| 2017/0339106 A1 | 11/2017 | Rimmer et al. |
| 2018/0048562 A1 | 2/2018 | Meyer |
| 2018/0063016 A1 | 3/2018 | Gulati et al. |
| 2018/0067775 A1 | 3/2018 | Frandzel et al. |
| 2018/0067856 A1* | 3/2018 | Walker ................ G06F 12/0868 |
| 2019/0199617 A1 | 6/2019 | Kalyanasundharam et al. |
| 2019/0317895 A1* | 10/2019 | Jung ..................... G11C 13/0004 |
| 2020/0371964 A1* | 11/2020 | Bhoria ................. G06F 12/0811 |
| 2021/0117366 A1* | 4/2021 | Zhang .................. G06F 13/4291 |

* cited by examiner

RE-PURPOSING BYTE ENABLES AS CLOCK ENABLES FOR POWER SAVINGS

BACKGROUND

Description of the Related Art

A variety of computing devices utilize heterogeneous integration, which integrates multiple types of processing units for providing system functionality. The multiple functions include audio/video (A/V) data processing, other high data parallel applications for the medicine and business fields, processing instructions of a general-purpose instruction set architecture (ISA), digital, analog, mixed-signal and radio-frequency (RF) functions, and so forth. A variety of choices exist for system packaging to integrate the multiple types of processing units. In some computing devices, a system-on-a-chip (SoC) is used, whereas, in other computing devices, smaller and higher-yielding chips are packaged as large chips in multi-chip modules (MCMs). Some computing devices include three-dimensional integrated circuits (3D ICs) that utilize die-stacking technology as well as silicon interposers, through silicon vias (TSVs) and other mechanisms to vertically stack and electrically connect two or more dies in a system-in-package (SiP).

In addition to input/output devices, each of these processing units is a source in the computing system capable of generating read requests and write requests for data. In addition to system memory, each of the sources is also capable of being a targeted destination for requests. Regardless of the chosen system packaging, the data access requests and corresponding data, coherency probes, interrupts and other communication messages generated by sources for targeted destinations are typically transferred through a communication fabric (or fabric). The fabric reduces latency by having a relatively high number of physical wires available for transporting packets between sources and destinations. The data transport of packets across the wires of the fabric and the toggling of nodes within storage elements, queues, control logic and so on in the fabric increases power consumption for the computing system.

The power consumption of modern integrated circuits has become an increasing design issue with each generation of semiconductor chips. As power consumption increases, more costly cooling systems, such as larger fans and heat sinks, must be utilized in order to remove excess heat and prevent circuit failure. However, cooling systems increase system costs. The circuit power dissipation constraint is not only an issue for portable computers and mobile communication devices, but also for desktop computers and servers utilizing high-performance microprocessors.

In view of the above, methods for efficient data transfer in a computing system are desired.

BRIEF DESCRIPTION OF THE DRAWINGS

The advantages of the methods and mechanisms described herein may be better understood by referring to the following description in conjunction with the accompanying drawings, in which.

Figure 1:
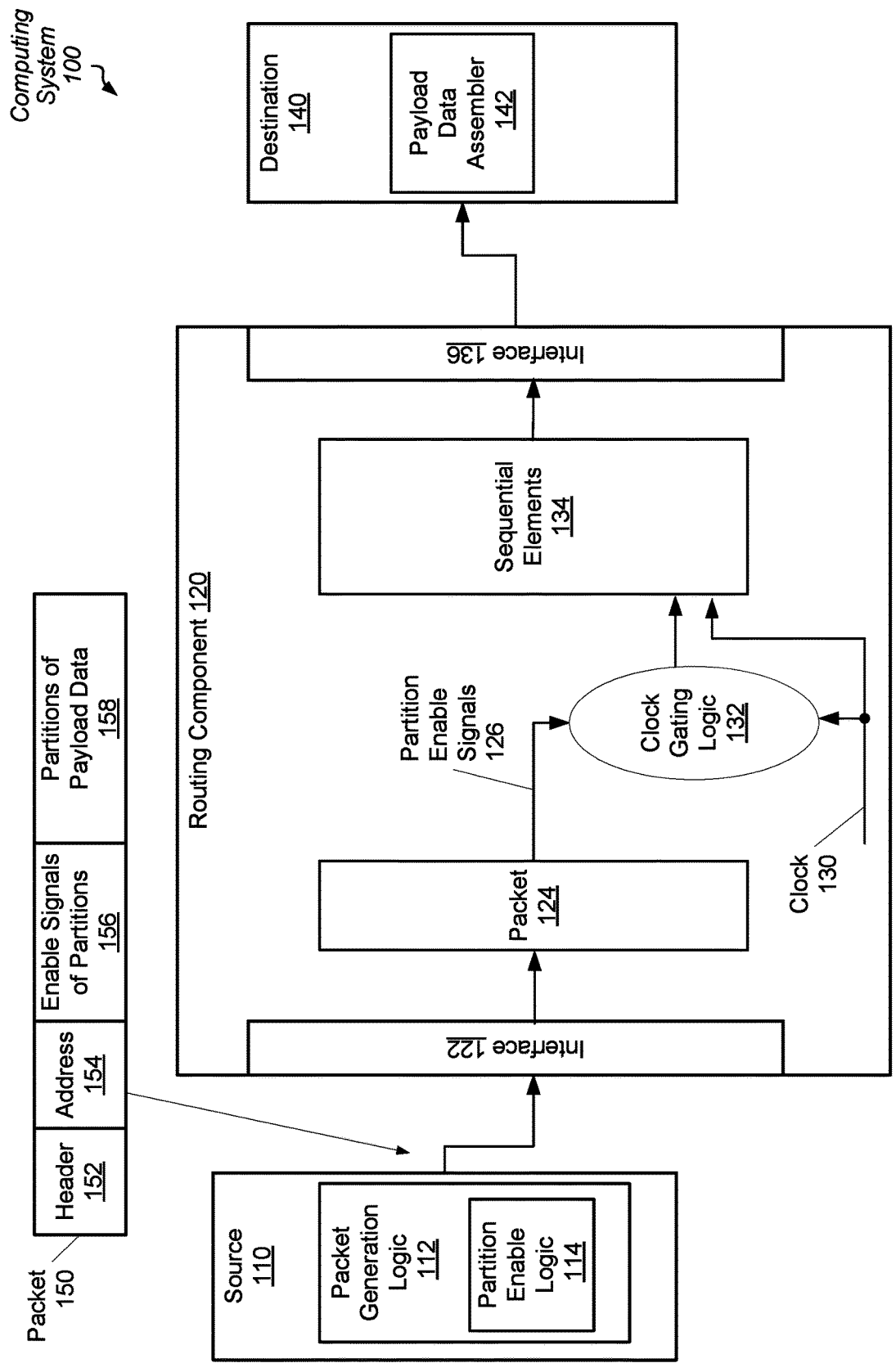
FIG. 1 is a block diagram of one embodiment of a computing system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the scope of the present invention as defined by the appended claims.

DETAILED DESCRIPTION OF EMBODIMENTS

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, methods, and computer-readable mediums for efficient data transfer in a computing system are disclosed. In various embodiments, a computing system includes one or more clients for processing applications. Examples of the clients include a general-purpose central processing unit (CPU), a graphics processing unit (GPU), an accelerated processing unit (APU), a multimedia engine, an input/output (I/O) device and so forth. Each of the clients is capable of generating data access requests. The clients are referred to as "sources" when the clients generate and send packets, which include data access requests, payload data, probe requests, coherency commands or other communication to send to a targeted destination. The clients and system memory are referred to as "destinations" when the clients and system memory are targets of packets generated by sources.

The sources send packets to destinations through a communication fabric (or fabric). Examples of interconnections in the fabric are bus architectures, crossbar-based architectures, network-on-chip (NoC) communication subsystems, communication channels between dies, router switches with arbitration logic, repeaters, silicon interposers used to stack chips side-by-side, through silicon vias (TSVs) used to vertically stack special-purpose dies on top of processor dies, and so on.

In some embodiments, sources divide payload data into partitions such as byte, word, double-word, and so on. In addition, in various embodiments partition enable signals for the partitions of payload data are generated. For example, the partition enable signals in field 156 are byte enable signals. In some embodiments, the sources generate the partition enable signals (or enable signals) to indicate which partitions include valid data of the payload data. For example, each of the partitions include valid data for a read response packet. Therefore, the source asserts each one of the enable signals corresponding to the multiple partitions of the payload data. Similarly, each of the partitions include valid data for a full write data packet and a cache victim packet used to send previously cached data to system memory. In other embodiments, the source negates one or more enable signals to indicate which partitions include invalid data of the payload data. For example, one or more of the partitions include invalid data for a partial write data packet.

In other embodiments, the source negates an enable signal for a particular partition when the source determines a type of the packet indicates the particular partition should have an associated asserted enable signal in the packet, but the source also determines the particular partition includes a particular data pattern. For example, a particular partition of read response payload data includes the particular pattern. Although a read response data packet typically has each one of the multiple enable signals asserted, the source negates the enable signal for the particular partition. Rather than transport the particular data pattern throughout the fabric, the negated enable signal indicates that the particular partition should store the particular pattern without the particular pattern actually being transported through the fabric.

The destination receives the read response data packet, and the destination determines both the type of the packet and the particular partition has an associated negated enable signal in the packet. In this example, the type of the read response data packet indicates the particular partition should have an associated asserted enable signal in the packet. Therefore, the destination interprets the negated enable signal as indicating the particular partition should include the particular data pattern. Accordingly, the destination inserts the particular data pattern for the particular partition when storing the read response payload data.

While transporting a packet between a source and a destination, one or more routing components receive and send the packet within the fabric. Examples of the routing component are router switches, repeater blocks and so forth. In various embodiments, the routing component receives the packet and determines one or more partitions of payload data have associated negated enable signals. Accordingly, the routing component disables a storage element of the routing component assigned to store data of partitions of the payload data associated with the negated enable signals. Later, when the routing component sends the packet to a next routing component or to the destination, the routing component sends the negated enable signal and a previous value stored in each storage element assigned to store data of partitions of the payload data associated with the negated enable signals. Since the clock signal was disabled, these storage elements did not load new values. The previous values are still stored in these storage elements. Additionally, these storage elements do not consume power associated with loading new values, and conditional clock signals do not toggle. In some embodiments, clock gating logic in the routing component uses the partition enable signals directly as a conditional clock gating control signal.

Referring to FIG. 1, a generalized block diagram of one embodiment of a computing system 100 is shown. As shown, source 110 sends a packet 150 to the destination 140 through a routing component 120. The source 110 is a client in the computing system 100 such as a general-purpose central processing unit (CPU), a graphics processing unit (GPU), an accelerated processing unit (APU), a multimedia engine, an input/output (I/O) device and so forth. The destination 140 is system memory or one of the examples of a client in the computing system 100. Examples of the routing component 120 is a repeater block, a network switch, or other component of a communication fabric. Although a single source 110, a single routing component 120 and a single destination 140 is shown, the computing system 100 includes any number of each of these blocks in other implementations. In some embodiments, the blocks 110-140 of the computing system 100 are individual dies on an integrated circuit (IC), such as a system-on-a-chip (SOC). In other embodiments, the blocks 110-140 are individual dies in a system-in-package (SiP) or a multi-chip module (MCM). Other blocks are not shown for ease of illustration such as a power controller or a power management unit, clock generating sources, link interfaces for communication with any other processing nodes, and memory controllers for interfacing with system memory.

The source 110 generates and sends packets. The source 110 and the destination 140 use packets for communicating data access requests, payload data, probe requests, coherency commands, and so forth. The packet generation logic 112 (or logic 112) generates the packet 150. Packet 150 includes multiple fields 152-158. Although the fields 152-158 are shown in a particular contiguous order, in other embodiments, the packet 150 uses another storage arrangement. In other embodiments, packet 150 includes one or more other fields not shown.

The header 152 stores one or more of commands, source and destination identifiers, process and thread identifiers, timestamps, parity and checksum and other data integrity information, priority levels and/or quality of service parameters, and so forth. In other embodiments, one or more of these fields are separated from the header 152 and located elsewhere in the packet 150. Examples of other fields not shown in the packet 150 are a virtual channel identifier, a response type for response packets, an indication of a transaction offset used when a read response for a large read request is divided into multiple data packets, an indication for response packets that represents whether the response packet includes a single response or multiple responses, and an indication of a number of credits for data packets, request packets and response packets. Other examples of fields stored in packet 150 are possible and contemplated in other embodiments.

The address 154 stores an indication of a target address associated with the command in the header 152. The field 156 stores enable signals associated with the partitions of the payload data stored in field 158. For data packets, the source 110 divides payload data into partitions. Examples of the partition size are a byte, a word (4 bytes), a dual-word (8 bytes), and so on. The partition enable logic 114 (or logic 114) generates the partition enable signals stored in field 156. When the partition size is a byte, the partition enable signals in field 156 are byte enable signals. In some embodiments, the logic 114 generates the partition enable signals (or enable signals) to indicate which partitions include valid data of the payload data stored in field 158. For example, each of the partitions include valid data for a read response packet. The command and/or the packet type is stored in the header 152. Therefore, the logic 114 asserts each one of the enable signals in the field 156 corresponding to the multiple partitions of the payload data in field 158. Similarly, each of the partitions include valid data for a full write data packet and a cache victim packet used to send previously cached data to system memory.

In other embodiments, the logic 114 negates one or more enable signals in field 156 to indicate which partitions include invalid data of the payload data in field 158. For example, one or more of the partitions include invalid data for a partial write data packet. As used herein, a signal is considered to be "asserted" when the signal has a value used to enable logic and turn on transistors to cause the transistor to conduct current. For some logic, an asserted value is a Boolean logic high value or a Boolean logic high level. For example, when an n-type metal oxide semiconductor (NMOS) transistor receives a Boolean logic high level on its gate terminal, the NMOS transistor is enabled, or otherwise turned on. Accordingly, the NMOS transistor is capable of conducting current. For other logic, an asserted value is a Boolean logic low level. When a p-type MOS (PMOS) transistor receives a Boolean logic low level on its gate terminal, the PMOS transistor is enabled, or otherwise turned on, and the PMOS transistor is capable of conducting current. In contrast, a signal is considered to be "negated" when the signal has a value used to disable logic and turn off transistors.

In some embodiments, the logic 114 negates an enable signal in the field 156 for a particular partition in the field 158 when the logic 114 determines a type of the packet indicates the particular partition should have an associated asserted enable signal in the packet, but the logic 114 also determines the particular partition includes a particular data pattern. For example, a particular partition of read response payload data includes the particular pattern. One example of the particular pattern is all zeroes in the particular partition. When the partition size is a byte, the particular partition includes eight zeroes. Other data patterns are possible and contemplated. Although a read response data packet typically has each one of the multiple enable signals asserted, the logic 114 negates the enable signal in field 156 for the particular partition in field 158. Rather than transport the particular data pattern through the routing component 120, the negated enable signal indicates that the routing component 120 should transport the packet 150 without the actual value of the particular partition.

In various embodiments, the interface 122 of the routing component 120 receives the packet 150. In some embodiments, the interface 122 includes the storage elements 134 for receiving and storing the packet 150. In other embodiments, the interface 122 includes impedance matching circuitry when the distance from the source 110 is appreciable. In yet other embodiments, the interface 122 includes wires to transfer the received packet to the storage elements 134. The packet 124 generally represents a packet received by the routing component 120 such as packet 150. Therefore, packet 124 includes the same fields described earlier for packet 150. The routing component 120 includes the clock gating logic 132 (or logic 132) for enabling and disabling the clock signal 130 to one or more of the storage elements 134. The storage elements 134 include one or more of registers, flip-flop circuits, content addressable memory (CAM), random access memory (RAM), and so forth. The logic 132 uses partition enable signals 126 from the packet 124 to conditionally enable and disable the clock signal 130 to one or more of the storage elements 134. For example, the logic 132 disables the clock signal 130 for each one of the storage elements 134 assigned to store data of partitions of the payload data associated with negated enable signals of the partition enable signals 126. Therefore, the logic 132 uses the partition enable signals 126 as clock enable signals. When the partition size is a byte, the logic 132 uses byte enable signals 126 as clock enable signals.

Later, when the routing component 120 sends the packet 124 to a next routing component (not shown) or to the destination 140, the interface 136 sends the packet information stored in the storage elements 134. The interface 136 includes simply wires, one or more logic gate buffers, or other circuitry for transmitting data. The interface 136 sends the negated enable signals of the partition enable signals 126 and a previous value stored in each storage element assigned to store data of partitions of the payload data associated with the negated enable signals. Since the logic 132 disabled the clock signal 130 for particular one of the storage elements 134, these particular storage elements did not load new values. The previous values from an earlier clock cycle are still stored in these particular storage elements and the interface 136 sends these previous values to the destination 140. The original values sent by the source 110 of the particular partitions of the payload data associated with negated partition enable signals of the signals 126 are not stored or transported by the routing component 120. Additionally, these storage elements do not consume power associated with loading new values, and their conditional clock signals do not toggle. In contrast, other ones of the storage elements 134 store the header 152, address 154 and the partition enable signals 156 of the packet 124. These storage elements receive a version of the clock signal 130, which is not qualified by the partition enable signals 126.

The destination 140 receives the packet information, and the destination 140 determines both the type of the packet and whether a particular partition of the payload data has an associated negated enable signal in the packet. When the packet type indicates each of the partitions of the payload data should have an associated asserted enable signal in the packet, but one or more of the partition enable signals are negated, the destination 140 determines that one or more of the partitions require insertion of a particular data pattern. As described earlier, when the packet type is a full size write packet, a read response packet, or a cache victim packet, typically, each of the partition enable signals is asserted. Therefore, the destination 140 interprets a negated enable signal as indicating the particular partition should include the particular data pattern. Accordingly, the payload data assembler 142 (or assembler 142) inserts the particular data pattern for the particular partition when storing the read response payload data.

It is noted that each of the source 110, the destination 140, the routing component 120, and the logic 112, 114 and 132 and the assembler 142 is implemented with one of hardware circuitry, software, or a combination of hardware and software. Although not shown, in other embodiments, the routing component includes multiple stages of storage elements in addition to multiple types of queues for storing packets based on packet type. For example, the routing component 120 uses multiple queues for storing read response data, write data, read access requests, write access requests, probe requests, and so forth. Additionally, in some embodiments, the routing component 120 uses arbitration logic for determining an order for sending packets to the destination 140 via the interface 136.

Figure 2:
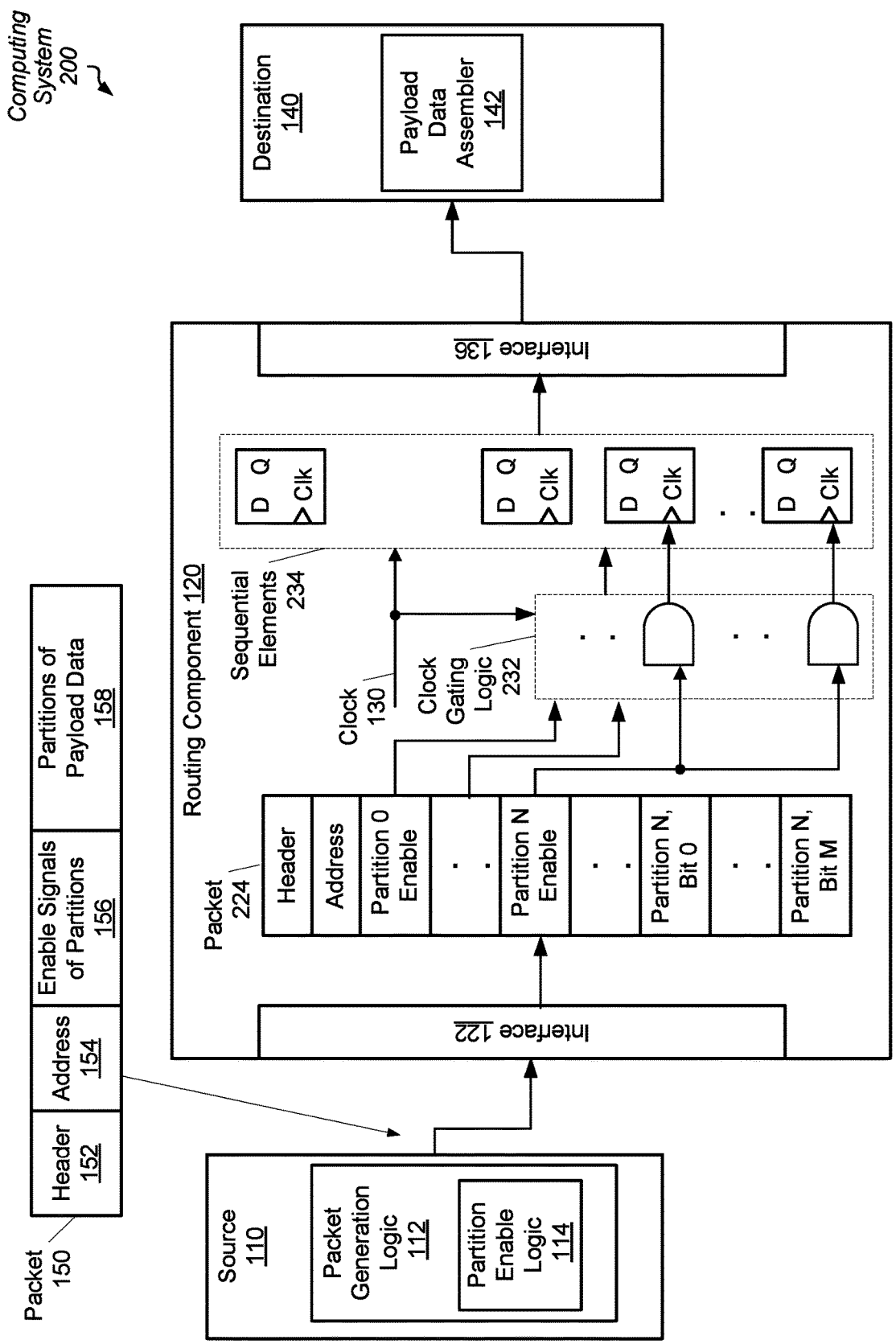
FIG. 2 is a block diagram of one embodiment of a computing system.

Turning now to FIG. 2, a generalized block diagram of one embodiment of a computing system 200 is shown. Circuitry and logic previously described is numbered identically. Although the storage elements 234 of the routing component 120 are shown as flip-flop circuits, other storage elements are possible and contemplated. The packet 224 generally represents a packet received by the routing component 120 such as packet 150. Therefore, packet 224 includes the same fields described earlier for packet 150.

The clock gating logic 232 (or logic 232) uses partition enable signals from the packet 224 to conditionally enable and disable the clock signal 130 to one or more of the storage elements 234. For example, the logic 232 disables the clock signal 130 for each one of the storage elements 234 assigned to store data of partitions of the payload data associated with negated enable signals of the partition enable signals. When the partition size is a byte, the logic 232 uses byte enable signals as clock enable signals.

As shown, the packet 224 includes N partitions with N being a positive, non-zero integer. Each of the partitions includes M bits with M being a positive, non-zero integer. As described earlier, examples of the partition size are a byte, a word, a dual-word, and so on. For each of the M bits of the Partition N, the logic 232 uses the Partition N Enable signal to conditionally enable the clock signal 130 for associated ones of the storage elements 234. When the partition size is a byte, the Partition N Enable is a byte enable signal for the M bits of the Partition N. The logic 232 uses the Partition N Enable signal as a clock enable signal for the payload data from Partition N, Bit 0 to Partition N, Bit M.

Figure 3:
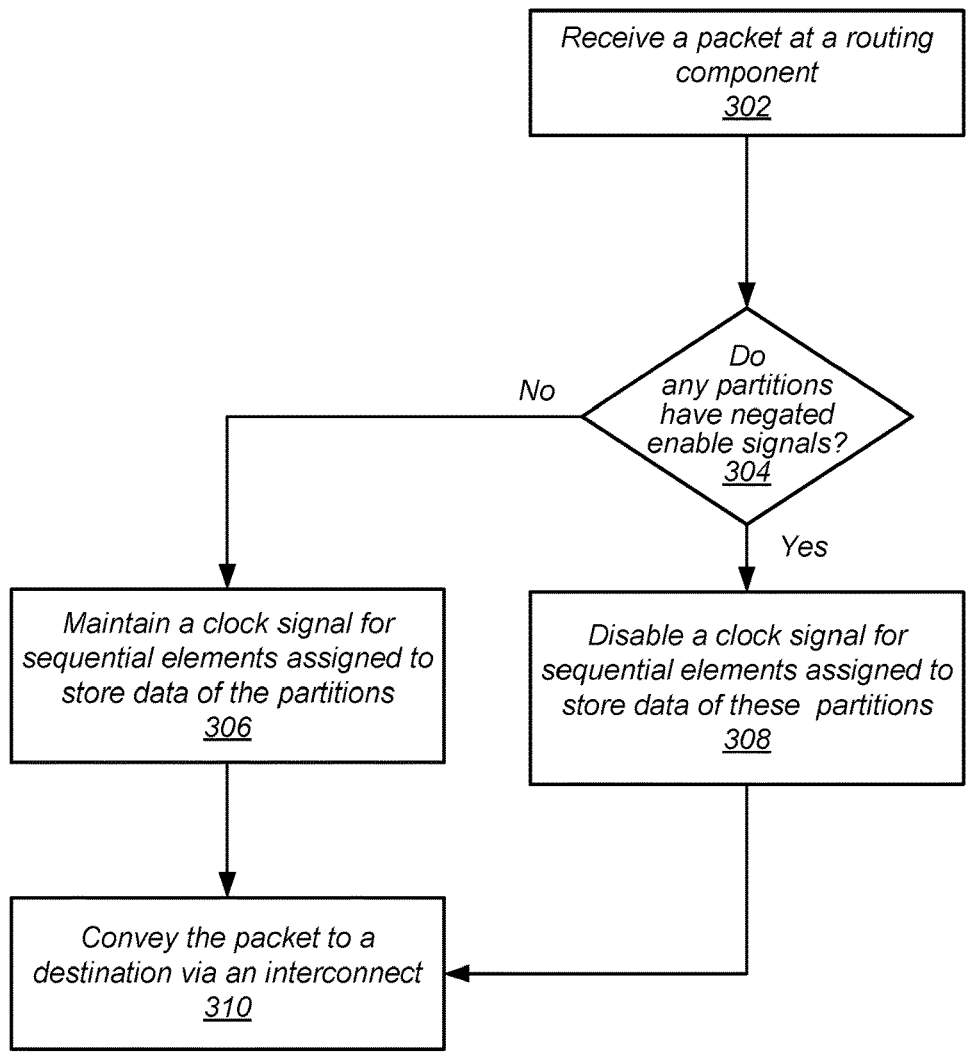
FIG. 3 is a flow diagram of one embodiment of a method for efficient data transfer in a computing system by a routing component.

Referring now to FIG. 3, one embodiment of a method 300 for efficient data transfer in a computing system by a routing component is shown. For purposes of discussion, the steps in this embodiment (as well as in FIGS. 4-6) are shown in sequential order. However, it is noted that in various embodiments of the described methods, one or more of the elements described are performed concurrently, in a different order than shown, or are omitted entirely. Other additional elements are also performed as desired. Any of the various systems or apparatuses described herein are configured to implement methods 300 and 400-600.

Sources generate packets and send the packets to destinations through a communication fabric of a computing system. The communication fabric includes one or more routing components. An interface of a particular routing component receives a packet (block 302). Control logic of the routing component is implemented by hardware circuitry, software, or a combination of hardware and software. The control logic analyzes the received packet. For example, the control logic decodes a command in the header. If the packet is a data packet storing payload data, then the control logic inspects partition enable signals corresponding to the partitions of the payload data.

If no partitions have negated enable signals ("no" branch of the conditional block 304), then the control logic maintains a clock signal for storage elements assigned to store data of the partitions (block 306). However, if any of the partitions have a negated enable signal ("yes" branch of the conditional block 304), then the control logic disables a clock signal for storage elements assigned to store data of these partitions (block 308). Therefore, the control logic uses the partition enable signals as clock enable signals. Afterward, the control logic conveys the packet to a destination via an interconnect such as the communication fabric (block 310).

Figure 4:
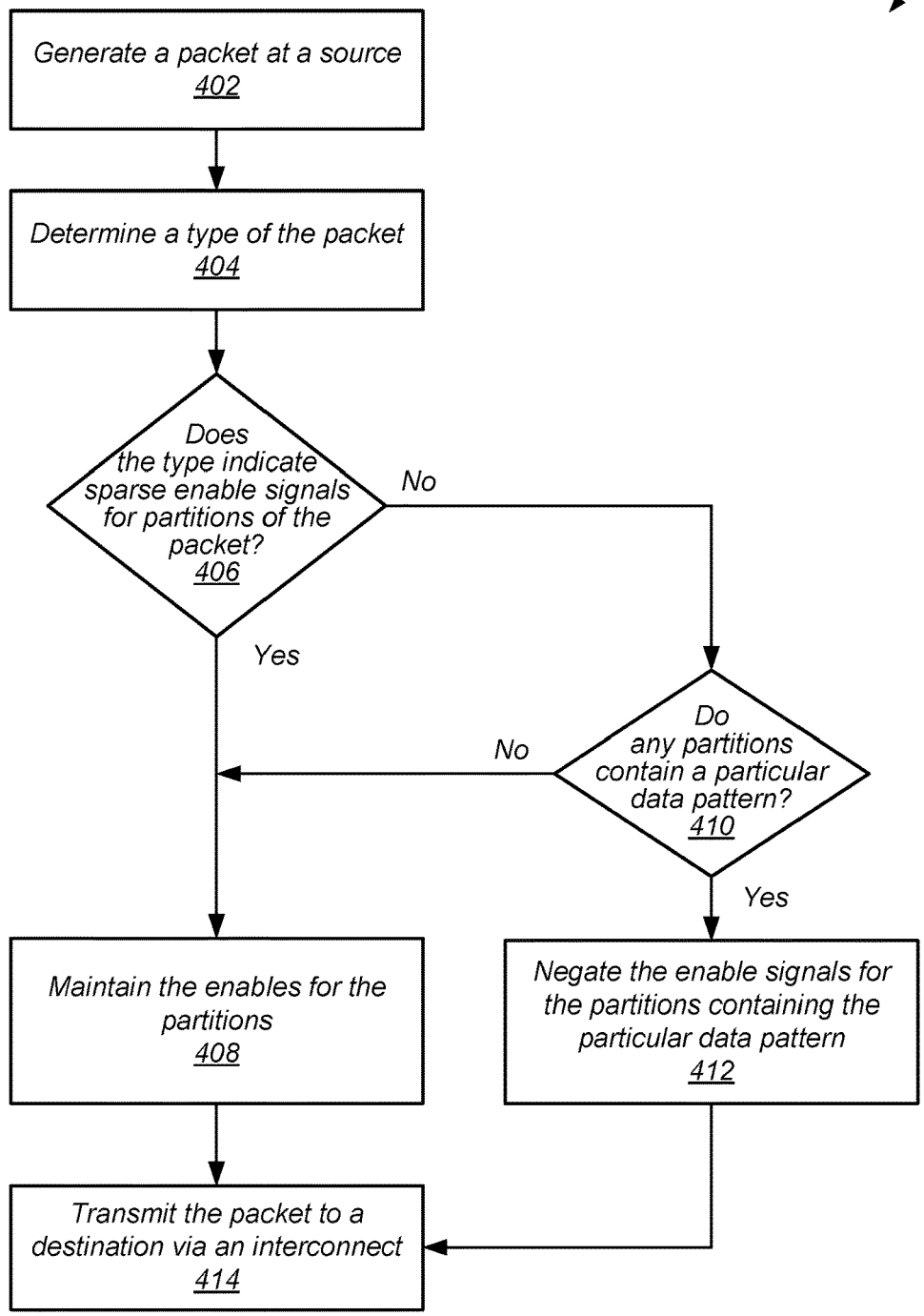
FIG. 4 is a flow diagram of one embodiment of a method for efficient data transfer in a computing system by a source.

Referring now to FIG. 4, one embodiment of a method 400 for efficient data transfer in a computing system by a source is shown. A source of one or more sources in a computing system generates packets in a computing system (block 402). Examples of sources are a general-purpose central processing unit (CPU), a graphics processing unit (GPU), an accelerated processing unit (APU), a multimedia engine, an input/output (I/O) device and so forth.

The source determines a type of the packet (block 404). Examples of packet types are read request packets, read response packets, full size write request packets, partial size write request packets, write data packets, cache victim packets, probe request packets, coherency command packets and so forth. In some embodiments, sources divide write requests into a write control packet and a write data packet. The source inserts a write command into the write control packet and inserts write data in a separate write data packet corresponding to the write command. In an embodiment, sources insert a read request command in a read control packet. Later, the destination receives the read control packet and inserts a read response command in a read control packet. The destination also inserts response data in a separate read data packet.

A partial size write request packet is one example of a packet type with sparse asserted enable signals for partitions of payload data. For example, when a source desires to update two words (8 bytes) of a 64-byte cache line, the partial size write request packet includes eight asserted partition enable signals for the eight bytes to be updated. The other 56 partition enable signals are negated. In another example, the source desires to update all of the 64-byte cache line except the last word (4 bytes). Therefore, the partial size write request packet includes 60 asserted partition enable signals for the sixty bytes to be updated. The remaining 4 partition enable signals are negated. For other packet types, such as read response packets, cache victim packets and full size write packets, each of the partition enable signals is asserted. There are no negated partition enable signals for these packet types.

If the packet type indicates sparse asserted enable signals for partitions of payload data ("yes" branch of the conditional block 406), then the source maintains the values for the partition enable signals (block 408). However, if the packet type does not indicate sparse asserted enable signals for partitions of payload data ("no" branch of the conditional block 406), then the source determines whether any partitions contain a particular data pattern. One example of the particular data pattern is all zeroes in the partition. Other examples of the particular data pattern are possible and contemplated.

If the source determines no partition contains the particular data pattern ("no" branch of the conditional block 410), then control flow of method 400 moves to block 408 where the source maintains the values for the partition enable signals. If the source determines any partition contains the particular data pattern ("yes" branch of the conditional block 410), then the source negates the enable signals for the partitions containing the particular data pattern (block 412). In some embodiments, the source asserts an indication in the packet header specifying that the packet has a packet type associated with no sparse asserted enable signals for partitions of the payload data. At a later time, the destination uses the indication, rather than decode the packet command in the header, to determine whether the packet type is associated with no sparse asserted enable signals for partitions of the payload data. The source transmits the packet to a destination via an interconnect such as a communication fabric (block 414).

Figure 5:
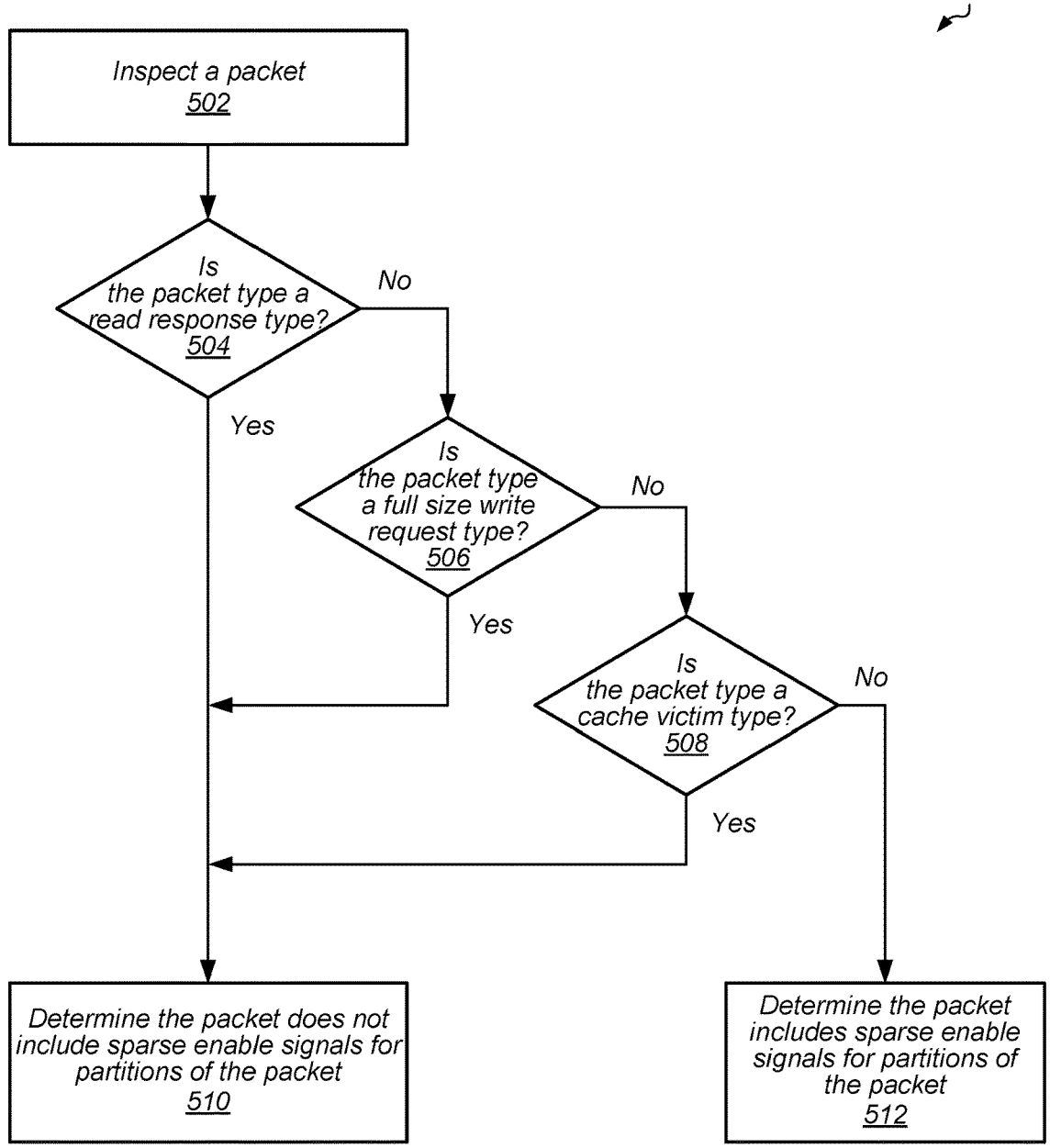
FIG. 5 is a flow diagram of one embodiment of a method for identifying packet types for efficient data transfer in a computing system.

Turning to FIG. 5, one embodiment of a method 500 for identifying packet types for efficient data transfer in a computing system is shown. Control logic receives a packet. The control logic is located within a source or a destination of a computing system. The control logic is implemented by hardware circuitry, software or a combination of hardware and software. The control logic inspects the packet (block 502). The control logic analyzes the header of the packet to determine the packet type. If the control logic determines that the packet type is a read response type ("yes" branch of the conditional block 504), or a full size write request type ("yes" branch of the conditional block 506), or a cache victim type ("yes" branch of the conditional block 508), then the control logic determines the packet does not include sparse enable signals for partitions of the packet (block 510). Otherwise, the control logic determines the packet does include sparse enable signals for partitions of the packet (block 512). These results are used later by the control logic for determining whether to update the partition enable signals as described earlier in method 400.

Figure 6:
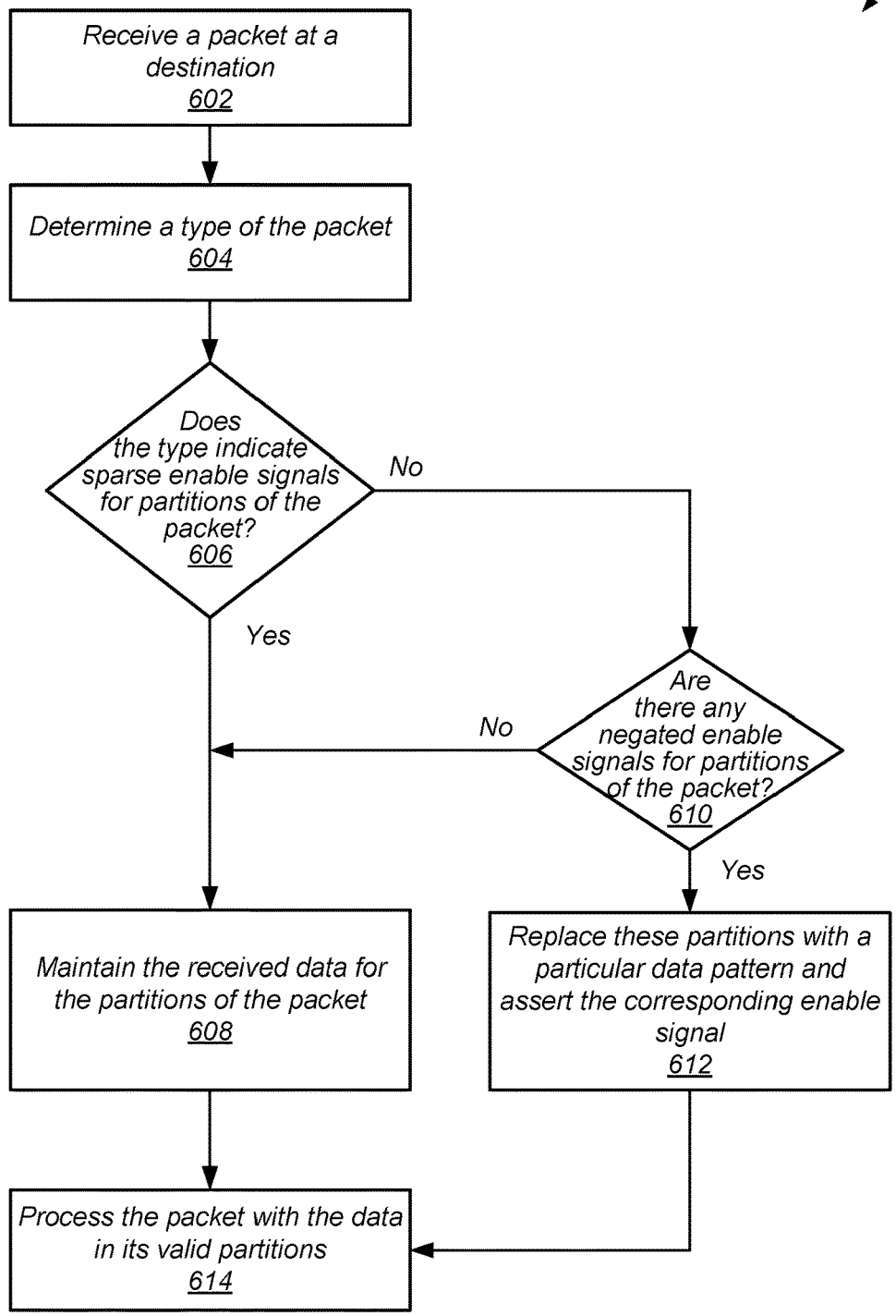
FIG. 6 is a flow diagram of one embodiment of a method for efficient data transfer in a computing system by a destination.

Turning to FIG. 6, one embodiment of a method 600 for identifying packet types for efficient data transfer in a computing system by a destination is shown. A destination of one or more destinations in a computing system receives packets in a computing system (block 602). Examples of destinations are system memory, a general-purpose central processing unit (CPU), a graphics processing unit (GPU), an accelerated processing unit (APU), a multimedia engine, an input/output (I/O) device and so forth. The destination determines a type of the packet (block 604). As described earlier, examples of packet types are read request packets, read response packets, full size write request packets, partial size write request packets, write data packets, cache victim packets, probe request packets, coherency command packets and so forth.

If the packet type indicates sparse asserted enable signals for partitions of payload data ("yes" branch of the conditional block 606), then the destination maintains the received data for the partitions of the packet (block 608). However, if the packet type does not indicate sparse asserted enable signals for partitions of payload data ("no" branch of the conditional block 606), then the destination determines whether any partitions have an associated enable signal that is negated. If there are no negated partition enable signals for the payload data ("no" branch of the conditional block 610), then control flow of method 600 moves to block 608 where the destination maintains the received data for the partitions of the packet.

If the destination determines there are any negated partition enable signals for the payload data ("yes" branch of the conditional block 610), then the destination replaces these partitions with a particular data pattern and asserts the corresponding enable signal (block 612). One example of the particular data pattern is all zeroes in the partition. Other examples of the particular data pattern are possible and contemplated. The destination processes the packet with the data in its valid partitions (block 614). For example, the destination performs a write operation for partitions with asserted partition enable signals. The data of these partitions update the data stored at memory locations at the destination pointed to by an address stored in the packet. In some embodiments, the particular data pattern is used although this particular data pattern was not transported by the communication fabric between the source and the destination.

Figure 7:
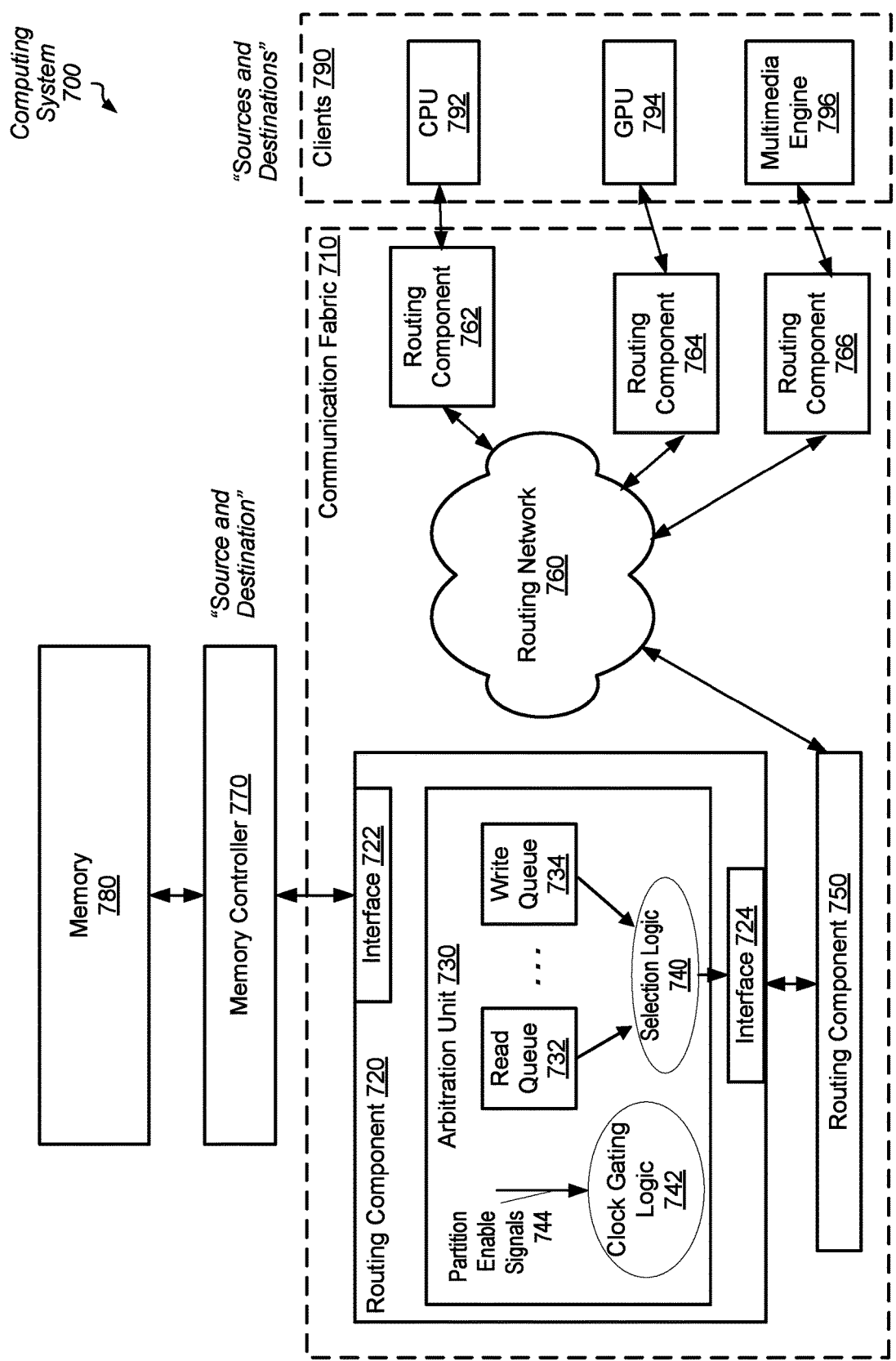
FIG. 7 is a block diagram of one embodiment of a computing system.

Turning now to FIG. 7, a generalized block diagram of one embodiment of a computing system 700 is shown. The computing system 700 includes communication fabric 710 between memory controller 770 and clients 790. Memory controller 770 is used for interfacing with memory 780. Although three clients 792-796 are shown in clients 790, computing system 700 includes any number of clients. The communication fabric 710 (or fabric 710) includes multiple types of blocks for routing control and data packets. For example, fabric 710 includes multiple routing components 720, 762, 764 and 766 in addition to routing component 750 and routing network 760. Each of the sources and destinations and fabric 710 in computing system 700 supports a particular interconnect protocol. Packets transported in fabric 710 include the same fields described earlier for packet 150 (of FIG. 1). One or more of the blocks in the fabric 710 include clock gating logic that uses partition enable signals as clock enable signals for disabling storage elements used to store partitions of payload data. For example, routing component 720 is shown to include clock gating logic 742, which receives partition enable signals 744. When the partition size is a byte, the partition enable signals 744 are byte enable signals. The clock gating logic 742 reduces power consumption for the computing system 700 by disabling clock signals. In various embodiments, the clock gating logic 742 has the equivalent functionality of clock gating logic 132 (of FIG. 1) and clock gating logic 232 (of FIG. 2).

In some embodiments, clients 790 are individual dies on an integrated circuit (IC), such as a system-on-a-chip (SOC). In other embodiments, clients 790 are individual dies in a system-in-package (SiP) or a multi-chip module (MCM). In yet other embodiments, clients 790 are individual dies or chips on a printed circuit board. In various embodiments, clients 790 are used in a smartphone, a tablet computer, a gaming console, a smartwatch, a desktop computer and so forth. Each of the clients 792, 794 and 796 is a functional block or unit, a processor core or a processor. For example, in an embodiment, the computing system 700 includes a general-purpose central processing unit (CPU) 792, a highly parallel data architecture processor such as a graphics processing unit (GPU) 794, and a multimedia engine 796. As described earlier, other examples of clients are possible such as a display unit, one or more input/output (I/O) peripheral devices, and one or more hubs used for interfacing to a multimedia player, a display unit and other. In such cases, the hubs are clients in computing system 700.

Memory controller 770 includes queues for storing requests and responses. Additionally, memory controller 770 includes control logic for grouping requests to be sent to memory 780, sending the requests based on timing specifications of the memory 780 and supporting any burst modes. Memory controller 770 also includes status and control registers for storing control parameters. In various embodiments, each of routing component 720 and memory controller 770 reorders received memory access requests for efficient out-of-order servicing. The reordering is based on one or more of a priority level, a quality of service (QoS) parameter, an age of a packet for a memory access request, and so forth. Although a single memory controller 770 is shown, in other embodiments, computing system 700 includes multiple memory controllers, each supporting one or more memory channels.

In various embodiments, memory 780 includes row buffers for storing the contents of a row of dynamic random access memory (DRAM) being accessed. In an embodiment, an access of the memory 780 includes a first activation or an opening stage followed by a stage that copies the contents of an entire row into a corresponding row buffer. Afterward, there is a read or write column access in addition to updating related status information. In some embodiments, memory 780 includes multiple banks. Each one of the banks includes a respective row buffer. The accessed row is identified by an address, such as a DRAM page address, in the received memory access request from one of the clients 790. In various embodiments, the row buffer stores a page of data. In some embodiments, a page is 4 kilobytes (KB) of contiguous storage of data. However, other page sizes are possible and contemplated.

In an embodiment, memory 780 includes multiple three-dimensional (3D) memory dies stacked on one another. Die-stacking technology is a fabrication process that enables the physical stacking of multiple separate pieces of silicon (integrated chips) together in a same package with high-bandwidth and low-latency interconnects. In some embodiments, the die is stacked side by side on a silicon interposer, or vertically directly on top of each other. One configuration for the SiP is to stack one or more memory chips next to and/or on top of a processing unit.

In various embodiments, an up-to-date (most recent) copy of data is brought from the memory 780 into one or more levels of a cache memory subsystem of one of the clients 790. Based on the instructions being processed by the client, the client updates the copy of the data and now contains the up-to-date (most recent) copy of the data. Alternatively, the client does not modify the data retrieved from memory 780, but uses it to process instructions of one or more applications and update other data. At a later time, the client fills its cache memory subsystem with other data as it processes instructions of other applications and evicts the particular data stored at the specified memory address. The copy of the data is returned from the corresponding one of the clients 790 to the memory 780 by a write access request to update the stored copy in the memory 780.

In various embodiments, fabric 710 transfers data back and forth between clients 790 and between memory 780 and clients 790. Routing components 762, 764 and 766 support communication protocols with clients 792, 794 and 796, respectively. In some embodiments, each one of routing components 720, 750, 762, 764 and 766 communicates with a single client as shown. In other embodiments, one or more of routing components 720, 750, 762, 764 and 766 communicates with multiple clients and tracks packets with a client identifier. In some embodiments, routing components 720, 750, 762, 764 and 766 include at least queues for storing request packets and response packets, selection logic for arbitrating between received packets before sending packets to network 760 and logic for building packets, decoding packets and supporting a communication protocol with the routing network 760. In an embodiment, routing components 720, 750, 762, 764 and 766 have updated mappings between address spaces and memory channels. In various embodiments, routing components 720, 750, 762, 764 and 766 and memory controller 770 include hardware circuitry and/or software for implementing algorithms to provide its desired functionality.

In various embodiments, fabric 710 includes control logic, status and control registers and other storage elements for queuing requests and responses, storing control parameters, following one or more communication and network protocols, and efficiently routing traffic between sources and destinations on one or more buses. In an embodiment, routing network 760 utilizes multiple switches in a point-to-point (P2P) ring topology. In other embodiments, routing network 760 utilizes network switches with programmable routing tables in a cluster topology. In yet other embodiments, routing network 760 utilizes a combination of topologies.

As shown, arbitration unit 730 includes read queue 732, write queue 736 and selection logic 740. Although two queues are shown, in various embodiments, arbitration unit 730 includes any number of queues for storing memory access responses. Selection logic 740 selects between selected read responses 734 and selected write responses 738 to send as selected responses 742 to a respective one of clients 790 via fabric 710. In one embodiment, arbitration unit 730 receives memory access responses from memory controller 770 via interface 722. In some embodiments, arbitration unit 730 stores received read responses in read queue 732 and stores received write responses in write queue 736. In other embodiments, the received read responses and received write responses are stored in a same queue. In some embodiments, arbitration unit 730 reorders the received memory access responses for efficient out-of-order servicing. Reordering is based on one or more of a priority level, a quality of service (QoS) parameter, an age of a packet for a memory access request, and so forth. The reordering algorithm is used by logic (not shown) within or positioned next to read queue 732 and write queue 736 as well as selection logic 740.

In various embodiments, the arbitration unit 730 includes programmable control registers and/or control logic to adapt algorithms used for selection and reordering of responses based on the characteristics of fabric 710. In some embodiments, each of the interfaces 722 and 724 include storage elements for storing received packets. The clock gating logic 742 receives partition enable signals 744 of data packets storing payload data divided into partitions. The clock gating logic 742 reduces power consumption for the computing system 700 by disabling clock signals to the storage elements in at least interfaces 722 and 724. When multiple components in the routing network 760 and the routing components 720, 750, 762, 764 and 766 use clock gating logic that relies on partition enable signals associated with partitions of payload data, the computing system 700 processes applications with reduced power consumption.

In various embodiments, program instructions of a software application are used to implement the methods and/or mechanisms previously described. The program instructions describe the behavior of hardware in a high-level programming language, such as C. Alternatively, a hardware design language (HDL) is used, such as Verilog. The program instructions are stored on a non-transitory computer readable storage medium. Numerous types of storage media are available. The storage medium is accessible by a computing system during use to provide the program instructions and accompanying data to the computing system for program execution. The computing system includes at least one or more memories and one or more processors that execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:
1. A computing system, comprising:
a source comprising circuitry configured to generate a packet comprising:
a plurality of partitions of a data payload; and
a plurality of enable signals, each of the enable signals indicating whether an associated partition of the plurality of partitions includes valid data; and
a routing component comprising circuitry configured to:
receive the packet from the source; and
disable a clock signal for each storage element of a plurality of storage elements assigned to store data of a given partition of the plurality of partitions, in response to determining an enable signal corresponding to the given partition indicates the given partition does not store valid data.

2. The computing system as recited in claim 1, wherein the routing component is further configured to convey to a destination:
  the enable signal; and
  a previous value stored in each storage element assigned to store data of the given partition.

3. The computing system as recited in claim 1, wherein the routing component is further configured to enable a clock signal for each storage element of the routing component assigned to store data of the given partition, in response to:
  determining the given partition has an associated enable signal in the packet that indicates the given partition stores valid data.

4. The computing system as recited in claim 1, wherein the source is further configured to set the enable signal for the given partition to a value that indicates the given partition does not store valid data, in response to:
  determining the given partition comprises a given data pattern.

5. The computing system as recited in claim 4, wherein the packet is a response type of packet.

6. The computing system as recited in claim 4, wherein the source is configured to:
  insert an indication of the given data pattern in the given partition of the packet.

7. The computing system as recited in claim 1, wherein the routing component further comprises one of a switch and a repeater of a communication fabric between the source and a destination.

8. The computing system as recited in claim 1, wherein the source comprises one or more of a central processing unit, a graphics processing unit and a multimedia engine.

9. A method, comprising:
  receiving, by a routing component, a packet comprising:
    a plurality of partitions of a data payload; and
    a plurality of enable signals, each of the enable signals indicating whether an associated partition of the plurality of partitions includes valid data;
  disabling, by the routing component, a clock signal for each storage element of a plurality of storage elements assigned to store data of a given partition of the plurality of partitions, in response to determining an enable signal corresponding to the given partition indicates the given partition does not store valid data.

10. The method as recited in claim 9, further comprising conveying to a destination:
  the enable signal of the given partition; and
  a previous value stored in each storage element assigned to store data of the given partition.

11. The method as recited in claim 9, further comprising enabling a clock signal for each storage element of the routing component assigned to store data of the given partition, in response to:
  determining the given partition has an associated enable signal that indicates the corresponding partition includes valid data.

12. The method as recited in claim 9, further comprising setting an enable signal for the given partition to indicate the given partition does not include valid data, in response to:
  determining the given partition comprises a given data pattern.

13. The method as recited in claim 12, wherein the packet is a cache victim type of packet.

14. The method as recited in claim 12, wherein the packet is a full size write type of packet.

15. The method as recited in claim 12, further comprising:
  inserting, by a source, an indication of the given data pattern in the given partition of the packet.

16. The method as recited in claim 9, wherein the routing component comprises one of a switch and a repeater of a communication fabric between a source and a destination.

17. An apparatus, comprising:
  a first interface configured to receive, from a source, a packet comprising:
    a plurality of partitions of a data payload; and
    a plurality of enable signals, each of the enable signals indicating whether an associated partition of the plurality of partitions includes valid data;
  a second interface configured to convey the packet to a destination;
  a plurality of storage elements; and
  circuitry configured to disable a clock signal for each storage element of the plurality of storage elements assigned to store data of a given partition of the plurality of partitions, in response to determining an enable signal corresponding to the given partition indicates the given partition does not store valid data.

18. The apparatus as recited in claim 17, wherein the circuitry is further configured to convey, via the second interface, to the destination:
  the enable signal; and
  a previous value stored in each storage element assigned to store data of the given partition.

19. The apparatus as recited in claim 17, wherein the circuitry is further configured to enable a clock signal for each storage element of the plurality of storage elements assigned to store data of the given partition, in response to:
  determining the given partition has an associated enable signal in the packet that indicates the given partition stores valid data.

20. The apparatus as recited in claim 17, wherein the apparatus comprises a switch of a communication fabric between the source and the destination.

* * * * *